Dec. 2 1952     J. T. MOORE, JR     2,620,074
BASKET

Filed Oct. 27, 1949     2 SHEETS—SHEET 1

INVENTOR
JUNIUS T. MOORE JR.

BY *Cushman, Darby & Cushman*
ATTORNEY

Dec. 2 1952　　　J. T. MOORE, JR　　　2,620,074
BASKET
Filed Oct. 27, 1949　　　　　　　　　　　　2 SHEETS—SHEET 2
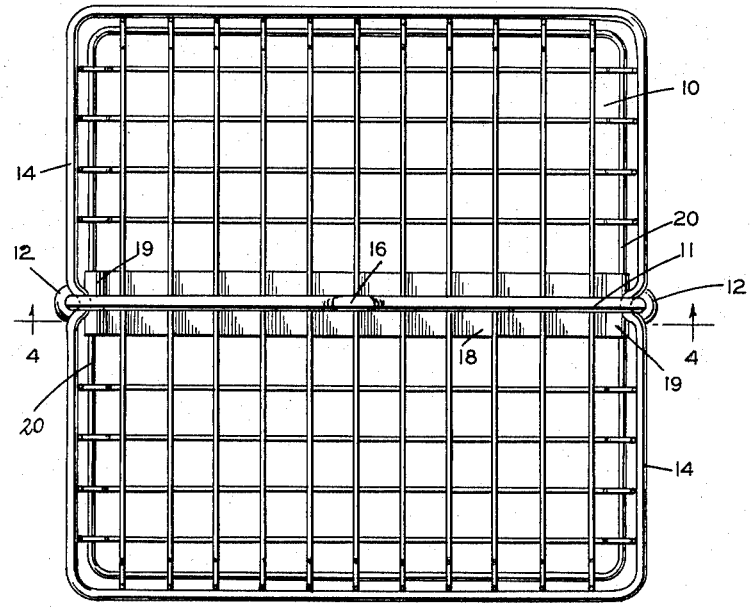
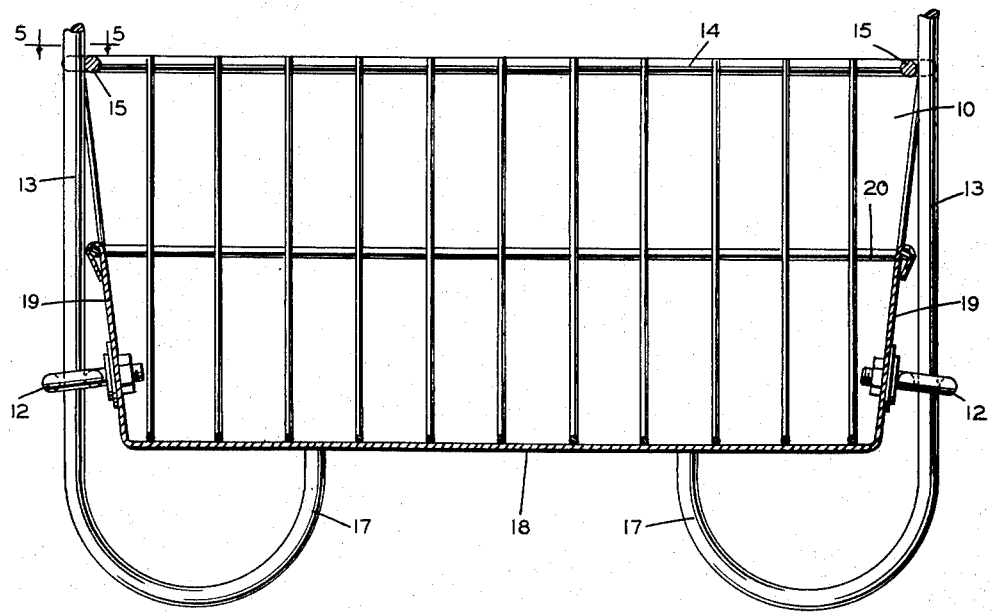
INVENTOR
JUNIUS T. MOORE JR.
BY *Cushman, Darby & Cushman*
ATTORNEY Patented Dec. 2, 1952

2,620,074

UNITED STATES PATENT OFFICE 2,620,074

BASKET

Junius T. Moore, Jr., Charleston, W. Va., assignor to Moore Company, Charleston, W. Va., a corporation of West Virginia Application October 27, 1949, Serial No. 123,959

9 Claims. (Cl. 211—119)

This invention pertains to baskets for storage and transportation of various articles, such, for example, as articles of wearing apparel, although not confined to that particular use as it may be put to a variety of uses.

It has for its object the provision of a basket of the open wire-mesh type to hold articles, which basket is provided with a movable handle which, in turn, has novel article-holding means for materials which it is desirable to segregate from the articles in the basket proper. The article-holding handle is so disposed and manipulated relative to the basket to which it is attached that it may be shifted from article-holding position, in which position it holds the articles against accidental displacement, to article-releasing position to permit the articles to be readily removed.

In the drawings herewith one form of the invention is shown for the purposes of illustration, but without limitation of the invention to the specific structure shown, except as limited by the appended claims defining the invention.

In the drawings:

Figure 4 is a sectional view on substantially the line 4—4 of Figure 3, looking in the direction of the arrows.

Figure 5 is a detail view on an enlarged scale on substantially the line 5—5 of Figure 4, looking in the direction of the arrows.

In describing the invention the several parts shown in the drawings will be designated by numerals, the same numerals being applied to the same parts in the different views.

Figure 1:
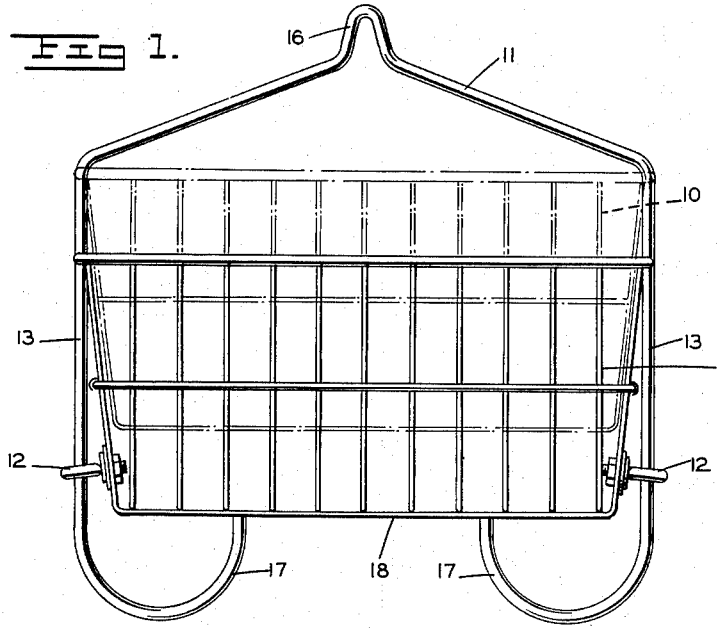
Figure 1 is a view in side elevation of the basket and handle, the basket being shown in the full and dotted line positions to illustrate the two different relations of basket and handle.
Figure 2:
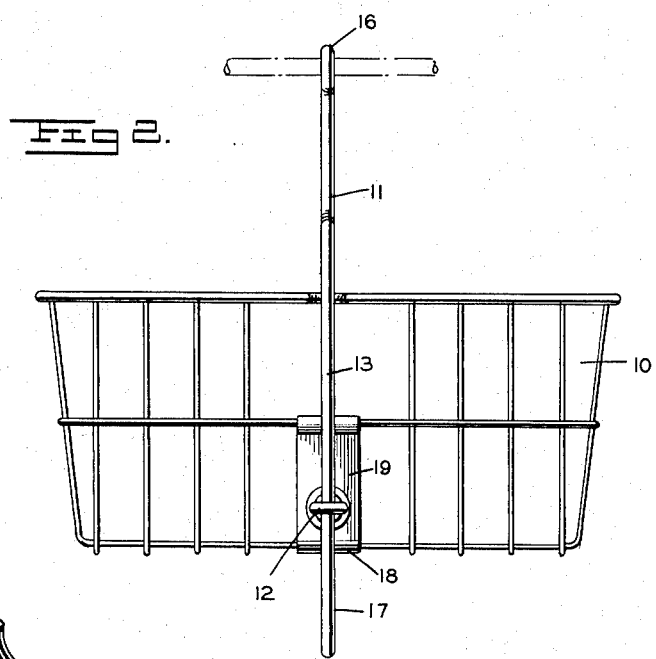
Figure 2 is an end view of the basket.
Figure 3:
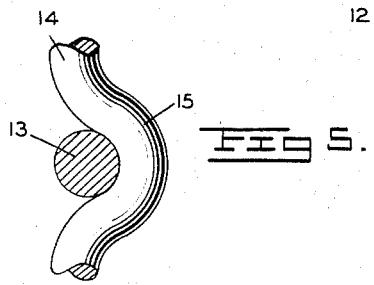
Figure 3 is a top plan view.

A basket 10 of the wire-mesh type is provided, such basket being here shown as rectangular, although it may be of other form. It may be of any size desired or necessary for the particular job to be handled. It has the usual horizontal and vertical bars and wires. A handle 11 of substantially inverted U-form is slidingly secured to basket 10 by means of eye-bolts 12 secured to the basket by means, presently to be described, through which the vertical limbs 13 of handle 11 move as the handle and basket are shifted relative to each other. The upper basket rod 14 is provided with bends or offsets 15 in line with eye-bolts 12 to engage and guide the limbs 13 of the handle and insure proper vertical travel and maintain handle 11 always in proper relation to basket 10 when shifted to its different positions.

The upper part of the generally U-shaped handle will preferably have its limbs inclined upwardly so as to give clearance for convenient deposit and removal of articles in and from the basket, a bend or loop 16 being provided centrally of the handle for suspending the basket from any suitable support.

The lower ends of limbs 13 of the handle 11 are turned inwardly and upwardly to form hooks 17 on opposite sides of the basket to segregate articles carried thereby, the ends of which hooks engage a stop plate 18 while the handle 11 is in its raised position, so as to close hooks 17 in which articles of clothing, towels, and the like may be suspended and held from accidental displacement. The basket 10 is intended to hold shoes, gloves, and other articles which it is desirable to keep separated from the clothing and other articles suspended from the hooks 17.

The stop plate 18 preferably is made in one piece and extends across the bottom of the basket with upturned ends 19 folded over the rod 20 of the basket 10, ends 19 serving as anchor plates for eye-bolts 12 which, by means of nuts and washers hold basket, stop plates, and handle in assembled condition.

The construction described and illustrated is simple in make-up and easily assembled. It can be shipped in set-up or disassembled form. It can be put together by unskilled workmen, as the basket, stop and anchor plate, and handle can be readily assembled and then secured together in assembled form by the eye-bolts.

In completed form, it provides a basket by means of which different types of articles may be segregated and transported or stored without danger of accidental loss, which articles may be conveniently and expeditiously deposited in and removed from the carrier. The basket member being open, and having no interior obstructions, permits the ready placing or removal of articles. The hooks on the handle, being turned inwardly beneath the basket, keep the article hung in those hooks from contacting adjacent objects. Further, since the hooks are separated from each other, articles hung on the spaced hooks may be segregated from one another. For example, soiled clothing may be placed in one hook and clean clothing in the other, thus eliminating contact between them. By placing the handle centrally of the basket balancing and level hanging of the basket is secured, and, since the basket, in the full line position shown in Figure 1, rests lightly on the articles carried by the hooks their accidental displacement will be prevented.

The basket with its contents may be suspended from any suitable support in locker or storage rooms, either from a fixed support, or, if desired suspended from a chain and pulley arrangement so that it may be drawn up out of the way.

It is obvious that changes from this illustrative disclosure may be made, and it is to be understood that such changes as involve only mechanical skill and are comprehended by the appended claims are to be regarded as within the purview of the claims defining the invention.

I claim:

1. A combination clothes hanger and basket comprising an article receiving basket member, a bail for suspending said basket, said bail having vertical limbs freely movable with respect to said basket, and inwardly turned substantially U-shaped clothes hangers integral with the vertical substantially parallel limbs of said bail for suspending articles of clothing beneath said article receiving basket.

2. A combination clothes hanger and basket comprising an article receiving wire basket member of open mesh, a bail having its limbs inclined upwardly for suspending said basket, a loop centrally located on said bail to receive the suspending means, inwardly turned U-shaped clothes hangers integral with the vertical limbs of said bail and movable with respect to said clothes basket for suspending articles of clothing beneath said article receiving basket.

3. A combination clothes hanger and basket comprising an article receiving basket member, a handle for suspending said basket of substantially inverted U-shape having substantially parallel side arms vertically movable relative to said basket member, inwardly turned substantially U-shaped clothes hanger hooks integral with the ends of the vertical limbs of said handle, a stop plate on the bottom of said basket against which the free ends of said clothes hanger hooks abut when said basket is in its suspended position to limit upward movement of said handle relative to said basket, and to secure clothing suspended from said hooks against being removed therefrom.

4. A receptacle for storing articles of wearing apparel comprising an article receiving wire basket member, a handle for suspending said basket of substantially inverted U-shape having substantially parallel side arms vertically movable relative to said basket member, inwardly turned substantially U-shaped clothes hanger hooks integral with the ends of the vertical limbs of said handle, means on said basket member for guiding said handle and clothes hooks in their vertical movements, a stop plate traversing the bottom of said basket member against which the free ends of said clothes hanger hooks abut when said basket is in its suspended position to limit upward movement of said handle relative to said basket and to secure clothing suspended from said hooks against being removed therefrom.

5. A receptacle for storing articles of wearing apparel comprising a wire basket member, a handle of substantially inverted U-shape having substantially parallel side arms vertically movable relative to said basket member, inwardly turned substantially U-shaped clothes receiving hooks integral with the vertical limbs of said handle, a stop plate traversing the bottom of said basket member against which the free ends of said clothes hanger hooks abut when said basket is in its suspended position to limit upward movement of said handle relative to said basket and to secure clothing suspended from said hooks against being removed therefrom, up-turned ends on said stop plate, and handle guiding means to engage the vertical substantially parallel limbs of said handle carried by the up-turned ends of said stop plate.

6. A receptacle for storing articles of wearing apparel comprising a wire basket member, a handle having its limbs inclined upwardly and having substantially parallel side arms vertically movable relative to said basket member, inwardly turned substantially U-shaped clothes carrying hooks integral with the vertical limbs of said handle, a stop plate traversing the bottom of said basket member against which the free ends of said clothes hanger hooks abut when said basket is in its suspended position to limit upward movement of said handle relative to said basket and to secure clothing suspended from said hooks against being removed therefrom, up-turned ends on said stop plate secured to said basket member, and eye-bolts mounted on said up-turned ends to guide the vertical limbs of said handle in its vertical motions.

7. A receptacle for storing articles of wearing apparel comprising a wire basket member, a handle having its limbs inclined upwardly to a point of medial contact, substantially parallel side arms vertically movable relative to said basket member, inwardly turned substantially U-shaped clothes supporting hooks integral with the lower free ends of the vertical limbs of said handle, a stop plate traversing the bottom of said basket member against which the free ends of said clothes hanger hooks abut when said basket is in its suspended position in order to limit upward movement of said handle relative to said basket and to secure clothing suspended from said hooks against being removed therefrom, up-turned ends on said stop plate secured to said basket member, eye-bolts mounted on said up-turned ends to guide the vertical substantially parallel side arms of said handle, and a second guiding means adjacent the upper edge of said basket member to prevent lateral displacement of said handle relative to said basket member.

8. A receptacle for storing articles of wearing apparel comprising a wire basket member, a handle for suspending said basket of substantially inverted U-shaped configuration having substantially parallel side arms vertically movable relative to said basket member, inwardly turned substantially U-shaped clothes carrying hooks integral with the lower free ends of the vertical substantially parallel side arms of said handle, a stop plate traversing the bottom of said basket member against which the free ends of said clothes hanger hooks abut when said basket is in its suspended position, up-turned ends on said stop plate secured to the side portions of said basket member, eye-bolts mounted on said up-turned ends to guide the lower segments of the vertical limbs of said handle, and indentations in said basket adjacent the top portion thereof to engage the upper segments of the vertical limbs of said handle and supplement the guiding action of said eye-bolts.

9. A receptacle for storing articles of wearing apparel comprising a wire basket member, a handle of substantially U-shaped configuration having substantially parallel side arms vertically movable relative to said basket member, inwardly turned substantially U-shaped clothes carrying hooks at the ends of the vertical side arms of said handle disposed on opposite sides of said basket in separated relation in a line substantially in a common plane, a stop plate traversing the bottom of said basket member against which the free ends of said clothes hanger hooks abut when said basket is in its suspended position to limit upward movement of said handle relative to said basket and to secure clothing suspended from said hooks against being removed therefrom, up-turned ends on said stop plate secured to said basket member, eye-bolts mounted on said up-turned ends to guide the vertical limbs of said handle, and inwardly bent sections on the side portions of said basket to receive the vertical substantially parallel side arms of said handle and supplement the guiding action of said eye-bolts.

JUNIUS T. MOORE, Jr.

REFERENCES CITED

The following references are of record in the file of this patent:

UNITED STATES PATENTS

| Number | Name | Date |
|---|---|---|
| 476,150 | Knight | May 31, 1892 |
| 613,888 | Schmuck | Nov. 8, 1898 |
| 809,568 | Hurlburt | Jan. 9, 1906 |
| 1,037,539 | Rodgers | Sept. 3, 1912 |
| 1,046,321 | Morrison et al. | Dec. 3, 1912 |
| 1,150,732 | Barnes | Aug. 17, 1915 |
| 1,312,891 | Carlin | Aug. 12, 1919 |
| 1,982,166 | Huttquist | Nov. 27, 1934 |
| 2,098,858 | Busson et al. | Nov. 9, 1937 |
| 2,458,133 | Behrens | Jan. 4, 1949 |
| 2,467,696 | Powell | Apr. 19, 1949 |

FOREIGN PATENTS

| Number | Country | Date |
|---|---|---|
| 9,110 | Great Britain | Apr. 18, 1912 |
| 10,283 | Great Britain | May 5, 1898 |
| 41,498 | Norway | June 15, 1925 |